United States Patent Office 3,091,515

Patented May 28, 1963

3,091,515

METHOD FOR PRODUCING TITANIUM DIOXIDE PIGMENTS

Horace F. Dantro, Perth Amboy, Anthony T. Kalinowski, Colonia, and Walter T. Siuta, Metuchen, N.J., assignors to National Lead Company, New York, N.Y., a corporation of New Jersey No Drawing. Filed Sept. 14, 1961, Ser. No. 137,993
7 Claims. (Cl. 23—202)

This invention relates in general to the production of titanium dioxide pigments. More specifically it relates to an improved process for producing titanium dioxide pigment of high purity and color brightness.

Titanium dioxide pigments are generally produced commercially according to the prior art by the so-called "sulfate process" in which a titaniferous material, such as a titaniferous iron ore, ore concentrate or a titanium slag is heated at elevated temperatures, with concentrated sulfuric acid to form a porous cake, sometimes referred to in the art as "digestion cake," containing titanium and iron sulfates. The digestion cake is allowed to cure so as to effect maximum recoveries of titanium values upon dissolving. After curing the cake is dissolved in water or weak acid, with agitation, to form a solution of titanium and iron sulfates. The ferric sulfate values in the solution are converted to ferrous sulfate by the addition, to the solution, of a reducing agent, such as scrap iron with or without antimony oxide. The solution is then clarified.

The purpose of clarification is to remove, by settling and filtration, essentially all of the solid material contained in the solution with minimum loss of $TiO_2$; and is effected by the addition to the solution of a clarification agent, such as sodium hydrosulfide, which reacts with the acid to liberate hydrogen sulfide. The latter reacts, with the soluble antimony in the solution to form a heavy flocculant that serves as the principal settling aid for removal of the slimes and undissolved residues. Glue is also used during clarification to collect and coagulate the very fine residue particles. As the clarification of the digestion solution proceeds most of the solids form as an underflow layer or mud in the bottom of the clarification tanks and since this mud may contain as high as 10% titanium a portion of the mud is recycled to recover as much as possible of the titanium values therefrom. The overflow solutions from the clarification and settling tanks are filtered by passing the solutions through suitable lead filters.

Following filtration the solution is then crystallized and filtered to remove most of the ferrous sulfate values; and is then concentrated to remove excess water both steps being necessary to prepare the solution for hydrolysis.

Crystallization of the iron values in the sulfate solution is accomplished in cone-bottomed, rubber lined vacuum crystallizers with agitation while maintaining the temperature of the solution in the range of from 30–40° C.; crystallization of the iron sulfate values to solid iron sulfate ($FeSO_4 \cdot 7H_2O$) being accomplished in about 1 to 2 hours. The solid iron sulfate crystals, sometimes referred to as copperas, are then removed from the residual titanium sulfate solution by filtration.

Before the residual titanium sulfate solution can be hydrolyzed to produce $TiO_2$ hydrate, part of the water must be removed therefrom and this is accomplished by evaporation in concentrators which operate under vacuum and at elevated temperatures. Concentration is continued until the specific gravity of the solution is at least 1.5 with a $TiO_2$ content of at least 200 grams per liter and preferably from 250–300 grams per liter. The concentrated titanium sulfate solution is then converted, by hydrolysis, from the soluble state into insoluble $TiO_2$ hydrate and in general this change is effected through dilution of the concentrated ilmenite solution with $H_2O$ at elevated temperatures. Thus a predetermined amount of ilmenite solution having a $TiO_2$ content of at least 200 grams per liter is preheated to a temperature of at least 90° C. and added at a predetermined rate, with agitation, to clear water at substantially the same temperature and in the ratio of 3–19 parts solution to one part water. During subsequent boiling, the precipitated $TiO_2$ forms initially as colloidal particles, which subsequently floc to produce a filterable $TiO_2$ hydrate containing from 30% to 36% solids.

In this connection it has been found that substandard filtering rates are indicative of poor pigmentary properties in the finished pigment and hence samples of the precipitated hydrate are taken periodically and tested for filterability by a standard laboratory test as follows:

500 ml. of the hydrolysate from 10% to 15% solids and at 80–90° C. is filtered, on a Büchner funnel, through two 18.5 cm. No. 3 Whatman filter papers under vacuum equivalent to 18 inches of mercury. The time in seconds to obtain a deliquored filter cake is noted. The cake is then analyzed for $TiO_2$ and the amount of $TiO_2$ in the cake determined. The filtering rate is then expressed as grams of $TiO_2$ per second. The normal filtering rate of titanium hydrates prepared by present processes, using clarified and concentrated solutions containing from 200 to 300 grams per liter $TiO_2$ is from 100–150 seconds; or from 0.5 to 0.7 gram of $TiO_2$ per second.

In order to meet the high standards set for commercial grades of pigment recourse is had to the addition of nuclei which may be formed in situ during hydrolysis or produced separately and added to the titanium sulfate solution prior to hydrolysis. Following precipitation of the hydrate the latter is filtered, washed and bleached to remove impurities, and then given precalcination treatments, calcined and finished according to techniques peculiar to the art.

In this connection it will be appreciated that the process steps outlined above merely high-light some of the steps heretofore regarded as necessary for the recovery of a commercial grade of $TiO_2$ hydrate from titaniferous materials relatively high in titanium and low in impurities. However, with some of the lower grades of titaniferous materials, i.e., materials having a relatively high level of impurities, it has been virtually impossible, with present techniques, to produce comparable $TiO_2$ hydrates economically, on a commercial scale.

Although earlier processes, as typified by the sulfate process described above, are capable of producing, from high grade titaniferous materials, $TiO_2$ pigment having reasonably low percentages of color degrading impurities it is desirable to have a process which will reduce the amount of retained impurities in the pigment to a point at which the impurities are no longer detrimental to pigment quality. It is also desirable to have a process which requires fewer and less complicated steps, less expensive equipment, and is capable of producing high quality pigment on a commercial scale from ores having high amounts of color degrading impurities. Various attempts have been made heretofore to accomplish these desired ends but none have proven satisfactory from a practical and economical standpoint.

An object, therefore, of the instant invention is to provide a process for producing titanium dioxide pigment of superior purity and color brightness, i.e., containing lower amounts of color degrading impurities than has been possible heretofore by previous commercial processes; the process also being one which is simple and economical to employ from a commercial standpoint. A still further object is to provide a process which not only makes it possible to produce superior quality pigment from all grades of titaniferous materials but also eliminates some of the process steps, critical controls, and expensive equipment heretofore deemed necessary for the production of high quality titanium dioxide pigment. These and other objects will become apparent from the following more complete description of the instant invention.

Broadly, this invention contemplates an improvement in the manufacture of titanium dioxide pigment wherein an initial titanium sulfate solution, which has been prepared from solubilized digestion cake without the conventional clarification, crystallization and concentration steps, and comprising no more than 180 grams per liter $TiO_2$ is hydrolyzed, in the presence of nuclei, to form an initial titanium hydrate, which after filtering and washing, produced an initial filter cake containing from 40% to 60% solids. This initial filter cake is then digested in concentrated sulfuric acid, the ratio of sulfuric acid to titanium dioxide in said digestion being from 1.3–2.5 parts sulfuric acid to one part titanium dioxide to form a digestion cake which is then dissolved in a predetermined amount of aqueous media to form a final titanium sulfate solution having a specific gravity from 1.5 to 1.7 and from 200 to 300 grams per liter $TiO_2$. This final solution is then filtered to remove any remaining impurities and hydrolyzed in the presence of nuclei, to form a final titanium hydrate. The final titanium hydrate so obtained is washed and bleached to produce a hydrate which is substantially free of color degrading impurities and when processed in the usual manner for finishing titanium hydrate produces a titanium dioxide pigment of superior purity and color brightness.

The improved process of this invention for producing $TiO_2$ pigment of high purity and color brightness from all grades of titaniferous materials is characterized by initial and final stages each stage embodying process steps peculiar to the production of the product of that particular stage.

The initial stage is initiated by digesting the titaniferous material in the manner currently employed in industry, i.e., the titaniferous material is heated at elevated temperatures in the presence of concentrated sulfuric acid to digest the titaniferous material and form therefrom a porous digestion cake containing titanium and iron sulfates. After curing the cake it is dissolved in a predetermined amount of water or weak acid to form a solution of iron and titanium sulfates, comprising from 80 to 180 grams per liter $TiO_2$ in which scrap iron is immersed to reduce the ferric values to ferrous iron. This reduced solution is hereinafter referred to as the initial titanium sulfate solution.

This initial titanium sulfate solution is, according to the preferred process of the instant invention, hydrolyzed directly to form an initial $TiO_2$ hydrate, i.e., without first subjecting the solution to conventional clarification, crystallization and concentration steps. It will be appreciated, however, that the initial sulfate solution so formed contains all of the slimes, undissolved solids and impurities normally removed by conventional clarification steps and hence in the event a titaniferous material is used containing an unusually high amount of impurities such that an excessive amount of slimes and undissolved residues is formed, clarification may be employed either partially or wholly if desired.

Although the slimes and undissolved residues formed during digestion of most grades of titaniferous materials will remain in the initial titanium sulfate solution, it has been found that these together with the ferrous iron values which are also retained in solution have no deleterious effect on the initial hydrate produced. Moreover, whereas conventional processes employ a costly evaporation step wherein the clarified and crystallized solution is heated under vacuum for sufficient length of time to produce a solution having a specific gravity of at least 1.5 and a $TiO_2$ concentration of from 200 to 300 grams per liter $TiO_2$, the present process omits this expensive step, the solution being formed simply by solubilizing the digestion cake in sufficient aqueous media to produce a solution having 80 to 180 grams per liter $TiO_2$ and a specific gravity of from about 1.15 to about 1.7. The omission of the conventional clarification, crystallization and concentration steps effects an appreciable saving in costly clarification and crystallization reagents as well as in processing equipment and man hours of operation required to produce the initial titanium sulfate solution.

Following preparation of the initial sulfate solution the latter is then hydrolyzed by first heating it to a temperature of about 90° C. and then adding the heated solution to water heated at about the same temperature, the ratio of the initial titanium sulfate solution to water being in the range of 1–2.3 parts solution to one part water. As is customary in conventional hydrolysis steps nuclei may be used to promote the formation of the $TiO_2$ crystals, the nuclei being formed in situ during hydrolysis or produced separately and added to the solution prior to hydrolysis.

The initial $TiO_2$ hydrate formed by hydrolysis of the aforesaid initial titanium sulfate solution comprises a relatively coarse granular mass which, when tested for filterability, as hereinabove described, is fast filtering, i.e., has a filtering rate of from 1.0 to 2.0 grams of $TiO_2$ per second as contrasted to a filtering rate of from 0.5 to 0.7 gram of $TiO_2$ per second for hydrates prepared by conventional methods. The high filterability of the initial hydrate made according to this invention is quite surprising and wholly unexpected in view of the fact that the slimes, undissolved residues and high amounts of iron values are present in the sulfate solution during hydrolysis.

The final stages in the process of the instant invention are initiated by washing the fast filtering initial hydrate in water or weak acid to remove the solubilized iron values and other solubilized impurities after which the hydrate may be deliquored by filtering or other suitable means to form an initial filter cake containing from 40% to 60% solids, which is sometimes referred to as a "wet" filter cake. The initial filter cake is then admixed with concentrated sulfuric acid in the ratio of 1.3 to 2.5 parts $H_2SO_4$ for each part of $TiO_2$ and heated at a temperature in the range of from 170–180° C. to digest the initial filter cake and form a final digestion cake which, after curing, is dissolved in a predetermined amount of water or weak acid to produce a final titanium sulfate solution.

It is noteworthy that in this final digestion the initial filter cake reacts much more completely with hot concentrated sulfuric acid than the filter cake of a conventional hydrate. Also when using a wet filter cake, i.e., one having a solids content of from 40% to 60% solids, the concentration of the sulfuric acid used in digestion should be above 98% whereas if the initial filter cake is first subjected to a drying treatment such as to raise the solids content to from 80% to 90%, acid concentrations of as low as 80% to 98% may be used successfully at digestion. While either the wet or dry filter cake may be employed with equal success, provided the ratio of $H_2SO_4$ to $TiO_2$ is maintained in the range specified above, it is preferred to work with a dry filter cake from the standpoint of acid concentration required and ease of handling.

Referring again to dissolution of the final digestion cake, the latter is dissolved in sufficient aqueous media to form a final sulfate solution from 200 to 300 grams per liter $TiO_2$ and a specific gravity of from 1.4 to 1.7, whereupon the final sulfate solution is filtered to remove any residual undissolved materials and then hydrolyzed in the manner hereinabove described for commercial prior art processes to produce a final $TiO_2$ hydrate. This final hydrate, is then washed, bleached, treated and calcined according to the techniques used in the art to produce a finished $TiO_2$ pigment.

To determine the color brightness value of the $TiO_2$ pigment, in terms of percent reflectance, the pigment was dispersed in a general purpose linseed oil and the percent green reflectance value of the wet paste was measured on a Colormaster Differential Colorimeter of the type manufactured by the Manufacturers Engineering Equipment Corporation, of Hatboro, Pennsylvania.

Using this test it was determined that the color brightness values of the $TiO_2$ pigments produced according to the improved process of the invention, in terms of percent reflectance, are at least 93% to as high as 93.8% whereas $TiO_2$ pigments made by prior art methods had percent reflectance values as low as 91.8%.

The content of vanadium and chromium (color degrading impurities) in the final hydrates and in the finished $TiO_2$ pigments was determined spectrographically on a Baird Research direct-reading spectrograph and found to be at least 50% less than the percentages of chromium and vanadium found in pigments made by commercial processes of the prior art.

In order to more fully illustrate the instant invention the following examples are presented:

EXAMPLE 1

A finely ground ilmenite ore was used in this example having the following analysis:

| Constituents: | Percent |
|---|---|
| $TiO_2$ | 59.8 |
| $Fe_2O_3$ | 23.7 |
| FeO | 10.9 |
| MgO | 1.1 |
| CaO | 0.63 |
| $SiO_2$ | 0.98 |
| $Al_2O_3$ | 2.0 |
| V | 0.13 |
| Cr | 0.10 |
| Others | 0.66 |

The ore was processed in the following manner:

1500 parts of the ground ore and 2,250 parts of 96.8% sulfuric acid were heated to 125° C. To this mixture were added 135 parts of water to "set off" the reaction. The water addition reduced the acid strength to 91%. Almost immediately the temperature rose to 190° C. and soon reached a temperature of 209° C. The resultant digestion mass was held at 170° C.–180° C. for two hours to form a "dry" digestion cake. The cake was then broken up and dissolved in water in the ratio of 1500 parts cake of 1500 parts water to form an initial titanium sulfate solution which was treated with 70 parts of powdered iron for a period of time such that all of the ferric iron values in the solution were reduced to the ferrous state, the latter condition being assured by the presence, in the solution, of 2 grams per liter of trivalent titanium. The reduced solution had the following analysis:

*Initial Titanium Sulfate Solution*

| | | |
|---|---|---|
| $Ti^{+3}$ (as $TiO_2$) | grams per liter | 2 |
| $TiO_2$ | do | 140 |
| $FeSO_4$ | do | 224 |
| $H_2SO_4$ | do | 308 |
| $H_2SO_4/TiO_2$ | | 2.2 |
| $FeSO_4/TiO_2$ | | 1.6 |
| Specific gravity (at 60° C.) | | 1.540 |
| Slimes and solids | grams per liter | 52 |

2,200 ml. of this initial titanium sulfate solution were heated to 96° C. and dropped into 1,100 ml. of water heated to 96° C. at the rate of 80 ml. per minute. Titanium nuclei formed in situ as the solution was added to the hot water. The solution was then boiled for 1.5 hours to form an initial, fast filtering, titanium hydrate which, despite the fact that it contained the undissolved slime and residues from the digestion operation, was very fast filtering, i.e., 1.72 grams $TiO_2$ per second, and hence could be washed rapidly. After washing the hydrate with 10 liters of hot acidified $H_2O$, it was filtered to produce a filter cake which contained 52.8% solids and had the following amounts of color degrading impurities, calculated on the $TiO_2$ basis:

*Color Degrading Impurities of Initial Filter Cake*

| | P.P.M. |
|---|---|
| V | 315 |
| Cr | 190 |

The initial filter cake was then dried to 87% solids by heating at 160–170° C. for 18 hours. 415 grams of this filter cake, equivalent to 320 grams $TiO_2$, were slowly added to 577 grams of 96.8% sulfuric acid $$(H_2SO_4/TiO_2=1.8)$$

with agitation and the mixture was heated to 180° C. The digestion mass was then cured for 3 hours at 185° C. to form a solid final digestion cake. 938 grams of this cake were then dissolved in 750 ml. of water in 1.5 hours to produce a relatively concentrated $TiO_2$ solution which was then filtered to remove the remaining undissolved residues. The filtered sulfate solution had the following analysis:

*Final Titanium Sulfate Solution*

| | | |
|---|---|---|
| $TiO_2$ | grams per liter | 225 |
| $H_2SO_4$ | do | 452 |
| $H_2SO_4/TiO_2$ | | 2.01 |
| Specific gravity (at 60° C.) | | 1.448 |

This final titanium sulfate solution was then heated to 96° C.; 960 ml. of this solution were then added into 170 ml. of water heated to 96° C. The additional rate was 60 ml. per minute. After 16 minutes addition time the mixture was heated to boiling and boiled for 3 hours to hydrolyze the titanium values. The slurry was then cooled to 90° C. and filtered to recover the precipitated final hydrate which was washed with 8 liters of hot acidified water. The filtered hydrate contained 34.5% solids and had a filtration rate of 1.1 grams $TiO_2$ per second.

The washed final hydrate was then bleached at 20% solids in 10% sulfuric acid for one hour at 80° C. Aluminum powder was used as the reductant. The amount of aluminum powder employed was 0.1% on a $TiO_2$ basis. The filtered, washed and bleached hydrate contained the following color degrading impurities, determined on a $TiO_2$ basis:

*Color Degrading Impurities of Final Hydrate*

| | P.P.M. |
|---|---|
| V | 1.6 |
| Cr | 1.4 |

The bleached and washed final titanium hydrate was processed to a finished pigment by conventional treatment as follows: the hydrate was repulped, treated with rutile promoter sol, and suitable conditioning agents after which the treated hydrate was dried and calcined. After cooling, the calcined product was wet milled, classified, coagulated, treated with a suitable conditioning agent, washed and dried. After thorough milling, the pigment possessed a fine texture and good tinting strength. The pigment had a high brightness, its reflectance value being 93.8%.

EXAMPLE 2

This example was run using the procedure described in Example 1 except that the final titanium solution was hydrolyzed in the presence of separately prepared nuclei. The nuclei used in this example was prepared as follows:

1845 grams of titanium hydrate slurry (equiv. to 436 grams $TiO_2$) were added to a 50% solution of sodium hydroxide (equivalent to 655 grams NaOH) with vigorous agitation. The mixture was heated to 85° C. and maintained at 85° C. for 1 hour. The slurry was then quenched in an equal volume of cold water, filtered and washed thoroughly to remove the soluble salts. The washed filter cake was repulped and diluted to 100 grams per liter $TiO_2$.

2,000 ml. of the final titanium solution, prepared in a manner similar to that described in Example 1 and containing 242 grams per liter $TiO_2$, were heated to 55° C. and to this solution were added 24.2 grams of externally prepared nuclei. The mixture was heated to boiling and boiled for 3 hours to hydrolyze and precipitate out the titanium values as a final hydrate. The final hydrate was filtered, washed and bleached in the regular manner and had a filtration rate of 1.15 grams $TiO_2$ per second.

The $TiO_2$ pigment obtained from this final hydrate had properties similar to that obtained in Example 1.

EXAMPLE 3

In this example titanium dioxide pigment was prepared using the commercial prior art process hereinabove described; the run being made as a control for effecting a comparison between the pigmentt made in Example 1, by the process of the instant invention, and a pigment produced by the prior art process. The prior art pigment was prepared as follows:

A batch of the same ore used in Example 1 was digested with concentrated sulfuric acid in the same manner as that described in Example 1 except that 4 parts of antimony trioxide were also added to the ore-acid mixture in order to have antimony present during a subsequent clarification step. The digestion cake formed was dissolved in the same manner, the iron values were reduced with powdered iron and the analysis of the solution was substantially the same as that described in Example 1.

The solution was then clarified by adding 20 parts of sodium hydrosulfide and 4.5 parts of glue and allowing the antimony sulfide floc formed to settle overnight at 50–60° C. to remove the slimes and suspended matter which were present in the solution. This clarified solution was then cooled to 18° C. to crystallize most of the iron values as copperas. After filtering, the crystallized solution had the following analysis:

*Clarified and Crystallized Titanium Sulfate Solution (Control)*

| | |
|---|---|
| $Ti^{+3}$ (as $TiO_2$) ---------- grams per liter | 1.7 |
| $TiO_2$ ---------- do | 154 |
| $H_2SO_4$ ---------- do | 255 |
| $FeSO_4$ ---------- do | 143 |
| $H_2SO_4/TiO_2$ | 1.66 |
| $FeSO_4/TiO_2$ | 0.93 |
| Specific gravity (at 60° C.) | 1.420 |

After removal of the crystallized copperas, the acid ratio of the solution was adjusted to 2.00 and the solution concentrated to contain 240 grams per liter $TiO_2$. The solution had the following analysis:

*Crystallized and Concentrated Solution (Control)*

| | |
|---|---|
| $Ti^{+3}$ (as $TiO_2$) ---------- grams per liter | 2.5 |
| $TiO_2$ ---------- do | 240 |
| $H_2SO_4$ ---------- do | 483 |
| $FeSO_4$ ---------- do | 229 |
| $H_2SO_4/TiO_2$ | 2.0 |
| $FeSO_4/TiO_2$ | 0.95 |
| Specific gravity (at 60° C.) | 1.646 |

2,080 ml. of this solution were hydrolyzed by heating to 96° C. and adding to 520 ml. of water heated to 96° C. The solution was added to the water at a rate of 122 ml. per minute. After the addition time of 17 minutes, the mixture was heated to boiling and boiled for 3 hours. The titanium hydrate formed was filtered and washed with acidified water. The hydrate had a filtering rate of 0.55 gram $TiO_2$ per second. The washed hydrate was then bleached, filtered, treated with rutile promoter sol and conditioning agents, calcined and wet milled in the same manner as that described in Example 1. The product was a titanium dioxide pigment of commercial quality. The color brightness, as measured by percent reflectance, and the amounts of V and Cr present in the pigment are recorded in Table 1 where they are compared with the results obtained for the pigment prepared in Example 1. It will be seen that the pigment produced by the process of Example 1 has a higher percent reflectance value and has lower amounts of color degrading impurities, such as V and Cr, than the pigment produced by the commercial prior art process.

TABLE 1

[$TiO_2$ pigment properties]

| | Example 1 | Example 3 (Control) |
|---|---|---|
| Reflectance ---------- percent | 93.8 | 92.0 |
| Impurities: | | |
| V ---------- p.p.m. | 1.6 | 3.4 |
| Cr ---------- p.p.m. | 1.4 | 2.9 |

EXAMPLE 4

A titanium sulfate solution was prepared from a different ore containing relatively high amounts of chromium by digesting the ore in concentrated sulfuric acid and dissolving the digested cake in water using substantially the same procedure as that described in Example 1. The solution had the following analysis:

*Initial Titanium Sulfate Solution*

| | |
|---|---|
| $Ti^{+3}$ (as $TiO_2$) ---------- grams per liter | 3 |
| $TiO_2$ ---------- do | 146 |
| $FeSO_4$ ---------- do | 322 |
| $H_2SO_4$ ---------- do | 292 |
| $H_2SO_4/TiO_2$ | 2.0 |
| $FeSO_4/TiO_2$ | 2.2 |
| Specific gravity (at 60° C.) | 1.550 |
| Slimes and solids ---------- grams per liter | 136.0 |

3,000 ml. of this solution were heated to 96° C. and added to 1,500 ml. of water heated to 96° C. at the rate of 100 ml. per minute, titanium nuclei being formed in situ as the solution was added to the water. The solution was then heated to boiling and boiled for 1.5 hours to form an initial, fast filtering, titanium hydrate which was filtered and washed with hot acidified water to remove dissolved impurities, the filtering rate of the initial hydrate being 1.17 grams $TiO_2$ per second even though it contained the undissolved residues from the digestion reaction. The washed hydrate was filtered and the resulting initial filter cake contained 51.1% solids and had the following content of color degrading impurities:

*Color Degrading Impurities of Initial Filter Cake*

| | P.p.m. |
|---|---|
| V | 54 |
| Cr | 339 |

The washed initial filter cake was heated to 160° C. for 20 hours to raise the solids content from 51.1% to 86.4%. The cake was then digested in concentrated sulfuric acid to form a final digestion cake which was dissolved in a predetermined amount of water to produce a concentrated $TiO_2$ solution, the digestion and dissolving steps being carried out in a manner similar to that described in Example 1. The resulting final sulfate solution was then filtered to remove the undissolved material and had the following analysis:

*Final Titanium Sulfate Solution*

| | |
|---|---|
| $TiO_2$ ---------- grams per liter | 249 |
| $H_2SO_4$ ---------- do | 547 |
| $H_2SO_4/TiO_2$ | 2.2 |
| Specific gravity (at 60° C.) | 1.487 |

3,200 ml. of this filtered final sulfate solution were then heated to 96° C. and added to 800 ml. of water heated to 96° C. The addition rate was 200 ml. per minute. After 16 minutes the mixture was heated to boiling and boiled for 3 hours to form and precipitate the final titanium hydrate. After cooling, the final hydrate was filtered and washed with 4 liters of hot acidified water. The filtered hydrate contained 32.4% solids.

The final hydrate was then bleached and washed in the same manner as that described in Example 1 and when analyzed had the following amounts of color degrading impurities on a $TiO_2$ basis:

*Color Degrading Impurities of Final Hydrate*

| | P.p.m. |
|---|---|
| V | 2.1 |
| Cr | 1.0 |

The final titanium hydrate was then processed according to the procedure described in Example 1 to form a pigment similar to that produced in Example 1.

EXAMPLE 5

Titanium dioxide pigment was prepared using the ore described in Example 4 and the commercial prior art procedure described in Example 3 to provide a control for comparing the results of Example 4 with the results obtained using a commercial prior art process.

The ground ore was digested in concentrated sulfuric acid, the digestion cake was dissolved in water and the solution obtained was clarified with antimony sulfide and glue. The clarified solution was crystallized to remove most of the iron values as copperas and then concentrated to obtain a titanium solution having a concentration of 249 grams per liter $TiO_2$. This solution was then hydrolyzed according to the hydrolysis procedure described in Example 3, the hydrate obtained being filtered and washed with acidified water.

The washed hydrate was then bleached and filtered and, when analyzed, had the following amounts of color degrading impurities on a $TiO_2$ basis:

*Color Degrading Impurities of Hydrate (Control)*

| | P.p.m. |
|---|---|
| V | 12 |
| Cr | 23 |

The bleached and washed titanium hydrate was then processed to produce a titanium dioxide pigment by the method described in Example 1. The pigment produced was inferior to that produced in Example 4 as shown by the results recorded to Table 2.

TABLE 2

[$TiO_2$ pigment properties]

| | Example 4 | Example 5 (Control) |
|---|---|---|
| Impurities: | | |
| V ---- p.p.m. | 2.1 | 12 |
| Cr ---- p.p.m. | 1.0 | 23 |

EXAMPLE 6

A titanium sulfate solution was prepared from a titanium concentrate of low iron and high vanadium contents by digesting the concentrate in concentrated sulfuric acid to produce an initial digestion cake and dissolving the digestion cake in a predetermined amount of water using substantially the same procedure as that described in Example 1.

The solution had the following analysis:

*Initial Titanium Sulfate Solution*

| | | |
|---|---|---|
| $Ti^{+3}$ | grams per liter | 2 |
| $TiO_2$ | do | 170 |
| $FeSO_4$ | do | 68 |
| $H_2SO_4$ | do | 323 |
| $H_2SO_4/TiO_2$ | | 1.9 |
| $FeSO_4/TiO_2$ | | 0.4 |
| Specific gravity (at 60° C.) | | 1.501 |

2,700 ml. of this digestion solution were heated to 96° C. and dropped into 1,350 ml. of water heated to 96° C. at the rate of 90 ml. per minute. The solution was then boiled for 1.0 hour during which an initial titanium hydrate was formed and precipitated from solution. This hydrate contained the slimes and undissolved residues from the digestion operation but despite this was fast filtering. The washed initial hydrate was then filtered and the filter cake contained 49.2% solids and had the following amounts of color degrading impurities:

*Color Degrading Impurities of Initial Filter Cake*

| | P.p.m. |
|---|---|
| V | 387 |
| Cr | 103 |

The initial filter cake was then dried at 160–170° C. for 18 hours at which time the solids content increased to 85.7%. 1,437 grams of this initial cake, equivalent to 1,230 grams $TiO_2$, were slowly added to 2,210 grams of 97.2% sulfuric acid ($H_2SO_4/TiO_2=1.8$) with agitation and the mixture was heated to 180° C. The digestion mass was then cured for 2 hours at 170° C. to form a solid digestion cake. 3,254 grams of cake were then dissolved in 2,300 ml. water to provide a concentrated $TiO_2$ solution which was agitated for 1.5 hours after which the solution was filtered to remove any undissolved residues. The final filtered sulfate solution had the following analysis:

*Final Sulfate Solution*

| | | |
|---|---|---|
| $TiO_2$ | grams per liter | 255 |
| $H_2SO_4$ | do | 560 |
| $H_2SO_4/TiO_2$ | | 2.2 |
| Specific gravity (at 60° C.) | | 1.537 |

2,900 ml. of this final sulfate solution were heated to 96° C. and added into 720 ml. of water heated to 96° C. The addition rate was 182 ml. per minute. After 16 minutes addition time the mixture was heated and boiled for 3 hours. The solution was then cooled to 90° C. and the hydrolyzed titanium values were filtered and washed with 8 liters of hot acidified water. The final hydrate contained 37.3% solids.

The washed hydrate was then bleached at 20% solids in 10% sulfuric acid for one hour at 80° C. Aluminum powder was used as the reductant, the amount of aluminum powder employed being 0.1% on a $TiO_2$ basis. The filtered, washed and bleached hydrate contained the following amounts of color degrading impurities:

*Color Degrading Impurities in Final Hydrate*

| | P.p.m. |
|---|---|
| V | 5.1 |
| Cr | 1.5 |

The bleached and washed hydrate was then processed as in Example 1 to produce a titanium dioxide pigment which had properties similar to those of the pigment produced in Example 1.

EXAMPLE 7

Using the same titanium concentrate used in Example 6, a run was made using the commercial prior art process to produce a pigment for comparison with the pigment produced in Example 6.

The titanium concentrate was digested in sulfuric acid and the solution obtained was clarified. It had the following analysis:

*Clarified Titanium Sulfate Solution (Control)*

| | | |
|---|---|---|
| $Ti^{+3}$ (as $TiO_2$) | grams per liter | 2 |
| $TiO_2$ | do | 136 |
| $H_2SO_4$ | do | 250 |
| $H_2SO_4/TiO_2$ | | 1.84 |
| Specific gravity (at 60° C.) | | 1.425 |

This solution was concentrated to 228 grams per liter $TiO_2$ and had a specific gravity of 1.642 at 60° C.

3,500 ml. of this solution heated to 96° C. were added to 388 ml. of water heated to 96° C., the solution being added to the water at a rate of 219 ml. per minute. After an addition time of 16 minutes the mixture was heated to boiling and boiled for 3 hours, to hydrolyze and precipitate the titanium values as hydrate which was filtered, washed and bleached in the usual manner. The bleached hydrate was then processed as in Example 1 to produce a titanium dioxide pigment. As shown in Table 3 the pigment produced was inferior to that produced in Example 6.

TABLE 3

[$TiO_2$ pigment properties]

| | Example 6 | Example 7 (Control) |
|---|---|---|
| Reflectance ............ percent | 93.3 | 91.8 |
| Impurities: | | |
| V ............ p.p.m. | 5.1 | 18.0 |
| Cr ............ p.p.m. | 1.5 | 4.4 |

From the above description and by the examples presented, it is clear that titanium dioxide pigments prepared by the improved process of this invention have higher color brightness values than pigments produced by conventional prior art methods; and contain lower amounts of color degrading impurities such as vanadium and chromium and hence are of relatively high purity.

The process of the instant invention is simple and economical to employ and may be characterized as a two stage process wherein an initial titanium sulfate solution containing ferrous sulfate values, slimes and undissolved impurities, and at low $TiO_2$ concentration, is hydrolyzed to produce a coarse, fast filtering initial hydrate of from 40–60% solids and high $TiO_2$ conversion; which is filtered to remove dissolved impurities and subsequently redissolved, filtered and hydrolyzed to produce a final hydrate of high purity; the latter then being washed, bleached, treated and calcined to produce a $TiO_2$ pigment of high purity and color brightness.

While this invention has been described and illustrated by the examples shown, it is not intended to be strictly limited thereto, and other modifications and variations may be employed within the scope of the following claims.

We claim:

1. A two stage process for producing a $TiO_2$ pigment of high purity and color brightness from titaniferous iron materials comprising the steps of: digesting said titaniferous iron material in concentrated sulfuric acid to form an initial digestion cake, dissolving said initial digestion cake in aqueous media to produce an initial titanium sulfate iron sulfate solution, the ratio of digestion cake to said aqueous media being adjusted such that the concentration of said initial sulfate solution is from 80 to 180 grams per liter $TiO_2$, reducing the iron values in said solution to the ferrous state, heating said solution in the presence of nuclei to precipitate an initial titanium hydrate having a filtering rate of from 1.0 to 2.0 grams $TiO_2$ per second, deliquoring said initial titanium hydrate to produce an initial filter cake having from 40% to 60% solids, digesting said initial filter cake in concentrated sulfuric acid in the ratio of from 1.3 to 2.5 parts sulfuric acid for each part filter cake on a $TiO_2$ basis to form a final digestion cake, dissolving said final digestion cake in aqueous media to produce a final titanium sulfate solution, filtering the undissolved residues from said solution, the ratio of final digestion cake to said aqueous media being adjusted such that the concentration of said final titanium sulfate solution is from 200 to 300 grams per liter, heating said final filtered titanium sulfate solution in the presence of nuclei to hydrolyze and precipitate a final titanium hydrate substantially free from color degrading impurities, and then separating to produce a final filter cake, washing, bleaching, treating and calcining said final filter cake to produce a $TiO_2$ pigment of high purity and color brightness.

2. Process according to claim 1, wherein the ratio of the initial digestion cake to the aqueous media is such as to produce an initial titanium sulfate iron sulfate solution of from 80 to 180 grams per liter $TiO_2$ and a specific gravity of from 1.15 to 1.70.

3. Process according to claim 2, wherein the initial titanium sulfate iron sulfate solution is hydrolyzed by heating said initial sulfate solution to a range from 50° C. to 100° C. and adding said heated solution at a predetermined rate to water heated to from 50° C. to 100° C. in the ratio of from 1.0–2.3 parts heated solution to one part heated water.

4. Process according to claim 1, wherein the ratio of the final digestion cake to the aqueous media is such as to produce a final sulfate solution of from 200 to 300 grams per liter $TiO_2$ and a specific gravity of from 1.4 to 1.7.

5. Process according to claim 4, wherein said final titanium sulfate solution is hydrolyzed by heating said final sulfate solution to from 90° C.–100° C. and adding said heated sulfate solution at a predetermined rate to water heated to from 90° C.–100° C. in the ratio of 3–19 parts heated solution to one part heated water.

6. In a process for producing a titanium dioxide pigment from titaniferous iron material wherein the titaniferous iron material is digested in hot sulfuric acid to produce a digestion cake, the improvement comprising: solubilizing said digestion cake in an aqueous media to produce an initial titanium sulfate iron sulfate solution containing undissolved solids, solubilized impurities and slimes, the ratio of digestion cake to water being adjusted such that the concentration of said initial sulfate solution is from 80 to 180 grams per liter $TiO_2$ reducing the iron values in said solution to the ferrous state, filtering said initial sulfate solution to remove the undissolved solids, heating said solution, in the presence of nuclei, to precipitate an initial hydrate having a filtering rate of from 1.0 to 2.0 grams $TiO_2$ per second, deliquoring said initial hydrate to form an initial filter cake having from 40% to 60% solids, digesting said initial filter cake in hot sulfuric acid to form a final digestion cake, solubilizing said digestion cake in an aqueous media to form a final sulfate solution having a concentration of from 200–300 grams per liter $TiO_2$, filtering said final sulfate solution, and then hydrolyzing said final filtered sulfate solution in the presence of nuclei to produce a final titanium dioxide hydrate.

7. Process according to claim 6, wherein the initial filtered sulfate solution is hydrolyzed by heating to from 50° C. to 100° C. and added at a predetermined rate to water heated to from 50° C. to 100° C. in the ratio of 1.0 to 2.3 parts heated solution to one part heated water.

References Cited in the file of this patent

UNITED STATES PATENTS

| | | |
|---|---|---|
| Re. 18,790 | Mechlenburg | Apr. 4, 1933 |
| 1,014,793 | Weintraub | Jan. 16, 1912 |
| 1,504,669 | Blumenfeld | Aug. 12, 1924 |
| 1,851,487 | Blumenfeld | Mar. 29, 1932 |
| 2,182,420 | Allan et al. | Dec. 5, 1939 |
| 2,290,112 | Merriam et al. | July 14, 1942 |
| 2,361,987 | Booge et al. | Nov. 7, 1944 |
| 2,804,374 | Marcot et al. | Aug. 27, 1957 |